Feb. 14, 1967  W. L. WILLIAMS  3,303,769
TRAILER VENTILATING ARRANGEMENT
Filed Jan. 21, 1965  4 Sheets-Sheet 1
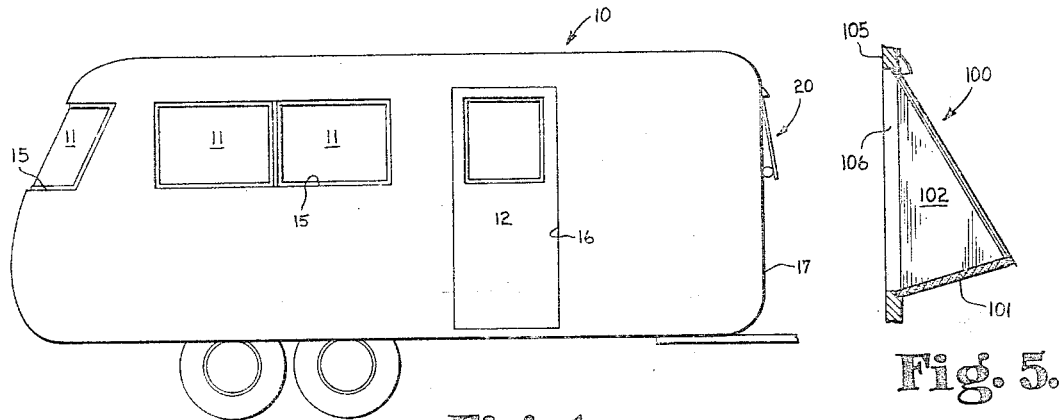
Fig. 1.
Fig. 5.
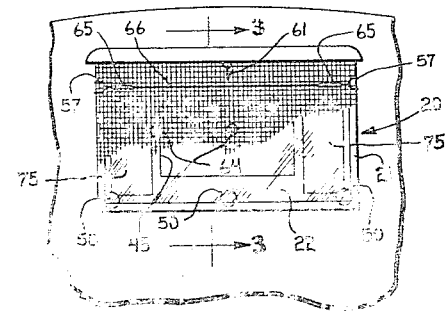
Fig. 2.
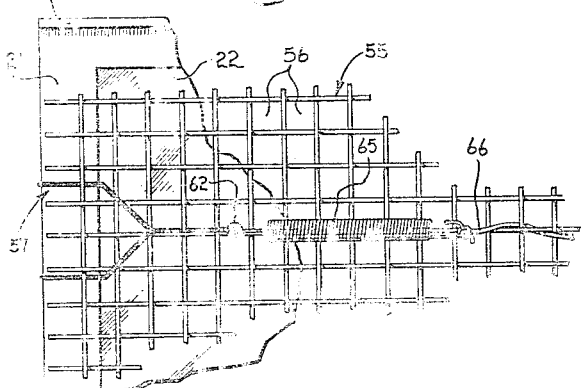
Fig. 4.
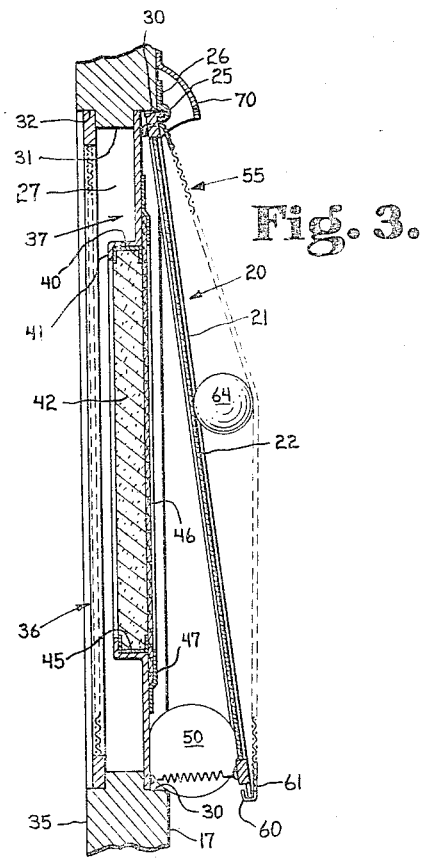
Fig. 3.
INVENTOR.
WAYNE L. WILLIAMS
BY
Lockwood, Woodard, Smith & Wickert
Attorneys

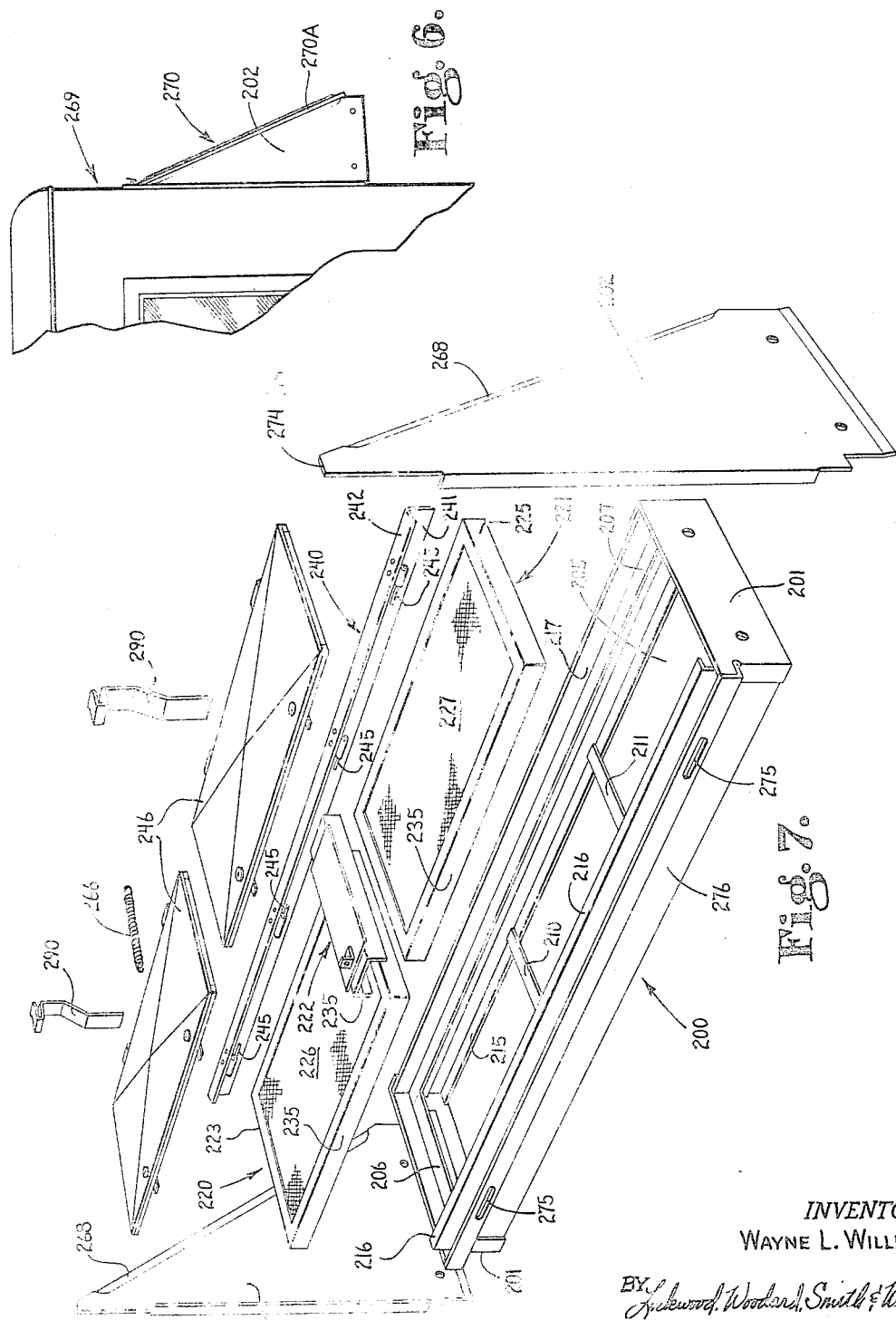

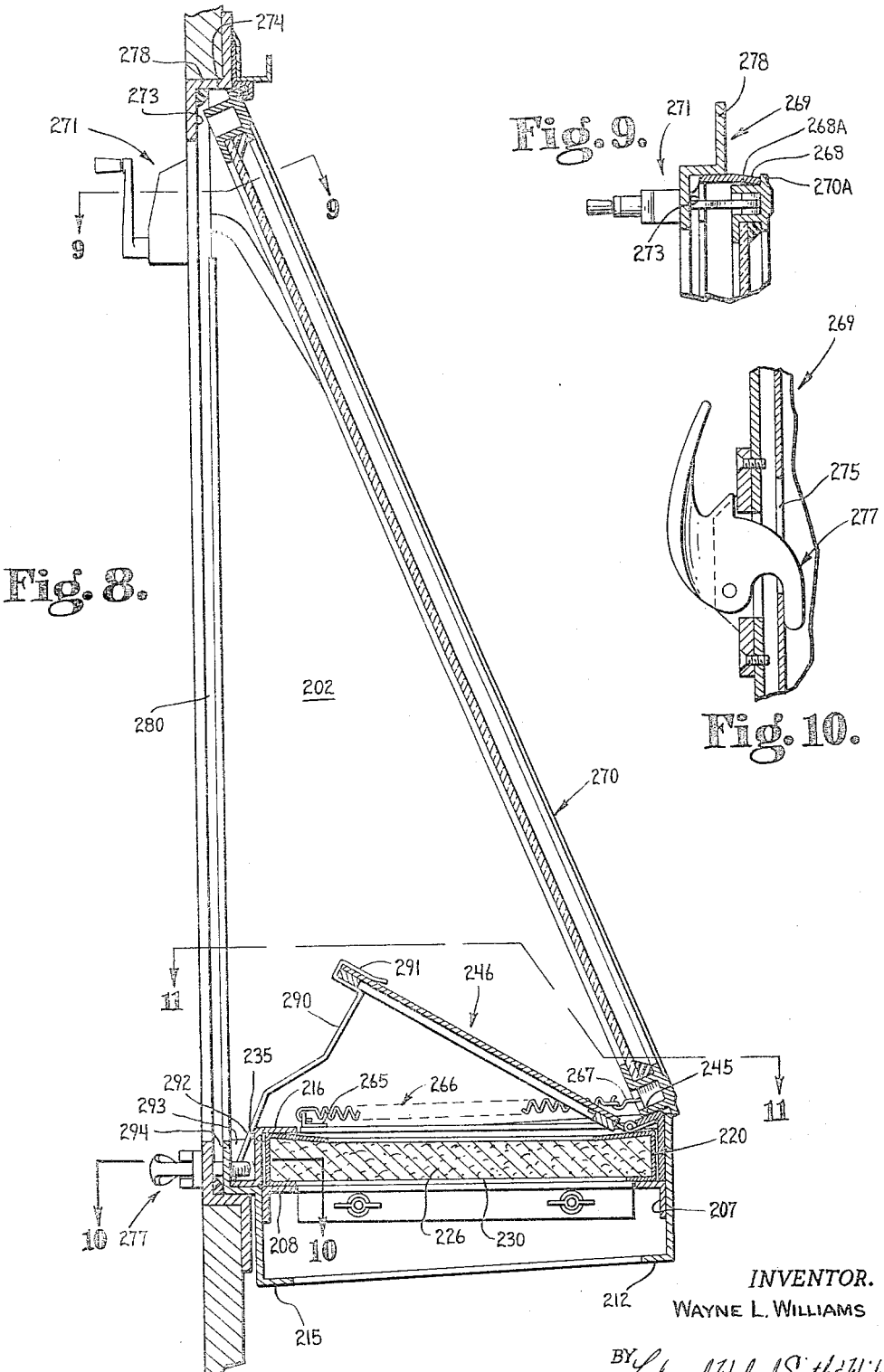

INVENTOR.
WAYNE L. WILLIAMS

BY Lakewood, Woodard, Smith & Weikart
Attorneys

United States Patent Office 3,303,769
Patented Feb. 14, 1967

3,303,769
TRAILER VENTILATING ARRANGEMENT
Wayne L. Williams, 4508 Northeastern Ave.,
Wanamaker, Ind. 46239
Filed Jan. 21, 1965, Ser. No. 429,202
10 Claims. (Cl. 98—2)

The present invention relates to a trailer ventilating arrangement and is a continuation-in-part of my copending application Serial No. 240,835, now abandoned.

In certain areas of the country such as the Alaskan Highway, there are available for travel only dusty gravel roads. It has been found that when commercially available travel trailers or campers are transported across such roads, the dust and dirt makes its way into the trailer and is deposited on tables, chairs, beds, in the trailer kitchen and, in fact, throughout the trailer. This dust finds its way around windows and doors and through minute cracks and crevices into the trailer. Consequently, a substantial portion of the trailer owner's time is spent sweeping, dusting and cleaning in order to remove such dust and dirt from the trailer.

Various measures have been tried to control such entry of dust and dirt into the trailer but without complete success. For example, tape can be placed around the windows of the trailer but is not appropriate for the door because of frequent opening. Also, in environments having relatively high temperatures and for the purpose of ventilation, it may be desired to open the windows at repeated intervals. Consequently, improved means for keeping dust and dirt out of a trailer is needed.

A primary object of the present invention is to provide a trailer ventilating arrangement capable of drastically reducing the entry of dust and dirt into a trailer.

Still another object of the invention is to provide a trailer ventilating arrangement incorporating improved means for preventing the breaking of the forwardly facing windows of the trailer by gravel and rocks.

A further object of the invention is to provide a trailer ventilating arrangement adapted to cool and ventilate the inside of the trailer and to simultaneously prevent entry of dust and dirt inside the trailer, the achievement of this latter object being particularly desirable because it makes the trailer immediately available for occupancy and cool even after long periods of travel on hot and dusty dirty roads.

Another object of this invention is to provide a trailer ventilating arrangement incorporating improved means for the mounting thereof upon a trailer.

Still a further object of the invention is to provide a trailer ventilating arrangement incorporating improved means for closing off the ventilating openings when ventilation is not needed such as, for example, in cold weather.

Related objects and advantages will become apparent as the description proceeds.

One embodiment of the present invention includes a trailer ventilating arrangement comprising a trailer having windows and doors mounted within openings in the trailer which openings permit passage of a certain amount of air even when the windows and doors are closed. The trailer has a forwardly facing aperture which receives an air filter. There is also provided means arranged to shield the aperture against the elements when the trailer is moving forwardly whereby air entering the trailer through the filter pressurizes the interior of the trailer and hinders entry of dust into the trailer through said openings.

The full nature of the invention will be understood from the accompanying drawings and the following description and claims.

FIG. 1 is a side elevation of a trailer incorporating the ventilating arrangement of the present invention.

FIG. 2 is a fragmentary front elevation of a portion of the trailer of FIG. 1 showing further details of the ventilating arrangement of the present invention.

FIG. 3 is a vertical section taken along the line 3—3 of FIG. 2 in the direction of the arrows.

FIG. 4 is a view similar to FIG. 2 but enlarged to show details of a protective screen attachment.

FIG. 5 is a section similar to FIG. 3 of an alternative embodiment of the invention.

FIG. 6 is a fragmentary side elevation similar to FIG. 1 of another alternative embodiment of the present invention.

FIG. 7 is an exploded perspective view of the embodiment of FIG. 6.

FIG. 8 is a vertical section similar to the sections of FIGS. 3 and 5 but showing the embodiment of FIGS. 6 and 7.

FIG. 9 is a section taken along the line 9—9 of FIG. 8 in the direction of the arrows but showing the structure in a different operating position.

FIG. 10 is a horizontal section taken along the line 10—10 of FIG. 8 in the direction of the arrows.

Figure 11:
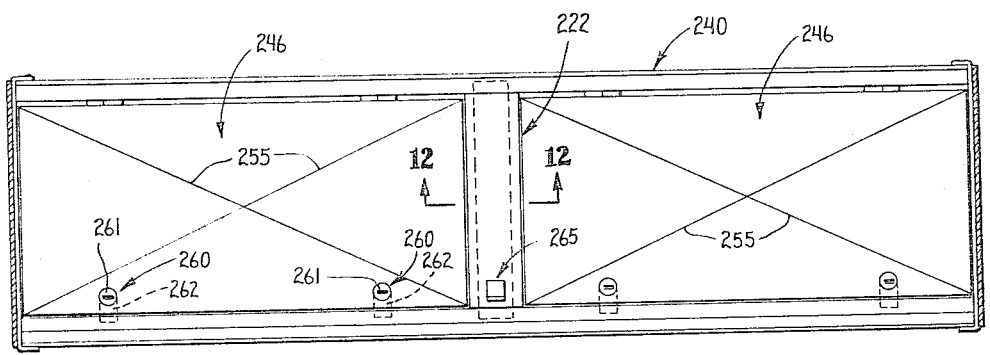
FIG. 11 is a horizontal section taken along the line 11—11 of FIG. 8 in the direction of the arrows but showing the apparatus in a different operating position than in FIG. 8.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a trailer 10 of the type commonly used for traveling from place to place. The trailer is provided with windows 11 in the rear and sides of the trailer and a door 12 in the side of the trailer. These windows and doors are received within openings 15 and 16 in the sides and rear of the trailer. The openings 15 and 16 are not completely closed by the windows and door mounted therein and a certain amount of air can leak past the windows and doors even though they are closed. Although no commercial trailer is intentionally designed to permit such leakage of air, all commercially available trailers possess this feature to a certain degree and as a result, dirt and dust finds its way into the trailer particularly when traveling on dusty gravel roads and the like.

At the forward wall 17 of the trailer, there is mounted a further window 20. This window includes a frame 21 within which is received a conventional transparent pane 22. The frame 21 has a hook 25 on its upper edge which is received within a mounting member 26 fixed to the forward wall 17 of the trailer just above the aperture 27 in the forward wall.

The window 20 is swingable by reason of its mounting on the member 26 and can pivot downwardly into a rectangular recess 30 bordering the aperture 27 for closing the aperture. The rectangular recess 30 is defined by in inwardly projecting portion 31 which extends inwardly of the aperture and completely around the aperture 27 and which also defines a further rectangular recess 32 contiguous with the inner surface 35 of the front wall 17. The rectangular recess 32 receives an inside screen 36 in conventional manner.

A generally flat section 37 of sheet-like material such as aluminum or the like is received within the aperture 27 between the screen 36 and the window 20 and in the recess 30 and in engagement with the inwardly projecting portion 31. At the central portion of the sheet-like section 37, there is formed a flange 40 which extends from the main portion of the section 37 first inwardly of the trailer and then inwardly of the aperture 27 at 41. A dense conventional furnace filter element 42 is received within the recess 45 defined by the flange 40 and 41. The filter 42 is covered by a sheet of cheesecloth 46 which is held in place over the filter by tape 47 which secures the cheesecloth to the sheet-like section 37.

The function of the cheesecloth is to extend the life of the filter 42 by preventing relatively large particles of dust and dirt from collecting on the filter. The cheesecloth can be removed and replaced a number of times before it is necessary to remove and replace the filter 42.

Received between the window 20 and the section 37 are three rubber balls 50. The rubber balls function to maintain the window 20 slightly open so that air forced against the forward wall 17 of the trailer by the forward movement of the trailer will enter around the edges of the window 20 through the filter and into the interior of the trailer. The balls 50 are held in place by tension springs 51 (only one shown) which are secured to and between the sheet-like section 37 and the window 20. If necessary, suitable adhesive material can be placed on the balls 50 to cause them to adhere to either or both of the window 20 and the sheet-like section 37.

A further screen 55 is mounted on the window 20. The screen 55 is formed from "hardware cloth" which includes heavy wire elements separated by approximately one-fourth to one-half inches so that the openings 56 through the screen have a size of approximately one-fourth to one-half inch. The function of the screen 55 is to prevent rocks and gravel from the gravel roads and thrown up by the wheels of vehicles from breaking the window 20. The screen 55 is held in place by hooks 57 which engage the window frame 25. The hooks 57 have a portion similar to the hooking portion 60 of the hook 61 which is also engaged on the window frame 21 but is fixed to the screen 55. The hooks 57, however, are provided with loops 62 which receive tension springs 65 connected to one another by a relatively long piece of heavy wire 66. An additional hook 61 and an additional set of the springs 65 and wire 66 is provided at the lower end of the screen 55 but are not shown herein. The springs 65 function to maintain the hooks 57 in engagement with the frame 21 while the wire 66 is woven through the screen and functions to strengthen the screen and protect the windows against breakage by the above mentioned rocks.

A plurality of rubber balls 64 are received between the screen 55 and the window and also function to prevent breakage of the windows. It can be appreciated that large rocks which strike the screen 55 may bend the screen but will not reach the window 20.

The window is shielded by a deflector 70 secured to the front wall 17 and extending along the complete length of the upper edge of the aperture 27. It can be appreciated that rain, snow, etc. cannot enter the aperture 27 because the shield 70 deflects such elements as does the window 20.

Referring to FIG. 2, it will be seen that the recess 45 defined by the flange 40 and 41 is much smaller than the size of the section 37 and that spaced horizontally of the recess 45 and filter therein there are provided window panes 75 mounted in the section 37. The window panes 75 permit a certain amount of light to enter the trailer through the aperture 27.

Referring to FIG. 5, an alternative embodiment of the invention is shown which is identical to the above described embodiment except as described below. The window 100 is pivoted outwardly of the trailer somewhat farther than the window 20 and is retained in the illustrated position by the filter 101 which has a rectangular shape and extends from one side of the window 100 to the other. The triangular members 102 fill the openings between the window 100, the filter 101 and the front wall 105 of the trailer. All the parts tightly engage one another or have sealing material therebetween to prevent leaks. If necessary, the filter 101 may be surrounded and received within a suitable rectangular frame. The advantage of this particular embodiment is that the window is completely unblocked so as to freely pass light into the trailer. Also, the aperture 106 is shielded from the elements by the window 100 and the triangular members 102.

Figure 12:
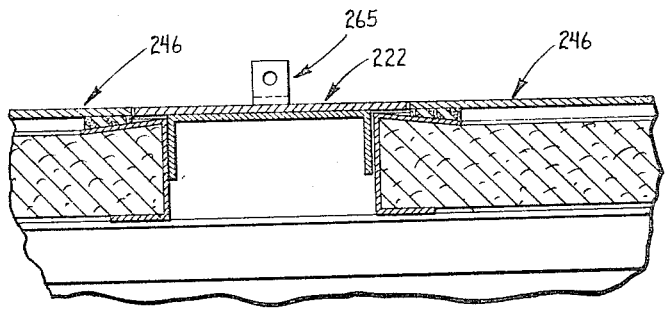
FIG. 12 is an enlarged vertical section taken along the line 12—12 of FIG. 11 in the direction of the arrows.
Figure 13:
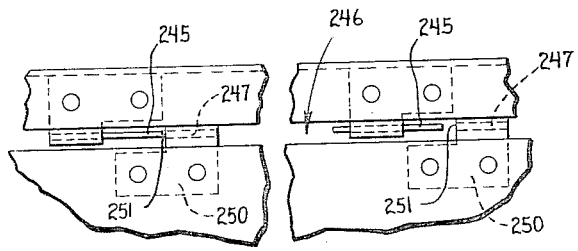
FIG. 13 is an enlarged fragmentary top plan of a cover forming a part of the present device and showing it just prior to mounting upon certain hinge pins also forming a part of the present device.
Figure 14:
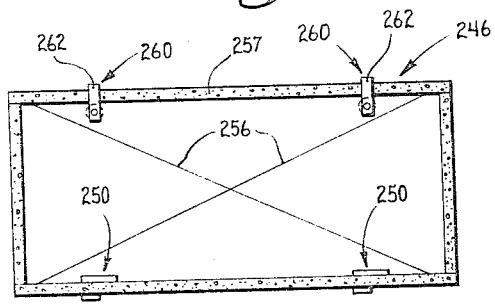
FIG. 14 is a bottom plan view of a representative one of said covers.

Referring more particularly to FIGS. 6-14, there is illustrated still another alternative embodiment of the present invention which includes a frame 200. Secured to the longitudinal ends 201 and frame 200 is a pair of generally triangular members 202. The frame 200 has a vertically extending opening 205 therethrough into which project four filter supporting flanges 206, 207 and 208 with one of said flanges being hidden in the figures.

A pair of brace members 210 and 211 are each secured at their opposite ends to further flanges 212 and 215 and extend across the vertical opening 205. A further flange 216 is fixed to the frame 200 at the rearward portion thereof above the flange 208 and projects toward the forward portion 217 of the frame. The further flange 216 acts as a retaining means preventing upward movement of filters 220 and 221 and upward movement of an air blocking element 222.

The filters 220 and 221 are identical and include peripheral frame portions 223 and 225 as well as wire mesh portions 226 and 227. The filters 220 and 221 are intended for permanent use and are preferably formed of aluminum or the like. When the lower surfaces 230 of the filters become dirty, the filters may be washed and cleaned with any suitable detergent. There is also available spray type coating materials for coating the lower surfaces 230 of the filters to assist the filters in trapping dirt, dust and irritating pollen. One suitable type of filter that might be used in the present invention is an E Z Kleen filter with .010 inch aluminum grids on both faces and manufactured by Research Products Corporation of Madison, Wisconsin.

It can be appreciated that air moving upwardly through the opening 205 must move through the filters 220 and 221 because the air is blocked by the flanges 206, 207 and 208 and by the blocking element 222. The blocking element 222 and filters 220 and 221 are mounted in the frame by first having their rearward portions 235 inserted beneath the flange 216 and resting upon the flange 208. The filters 226, 227 and blocking element 222 are then swung downwardly to rest on the flanges 206 and 207 (and the unshown flange) and to the rear of the forward portion 217. Next, an elongated member 240 of angle cross section has its leg inserted between the filters 220 and 221 and the blocking element 222 on the one side and the forward portion 217 of the frame on the other side. The elongated member 240 is arranged with its other leg 242 projecting rearwardly over the filters and blocking element. The elongated member 240 has mounted on its leg 242 a plurality of hinge pins 245 which are used to swingably mount a pair of covers 246 used to close off air flow through the filters 220 and 221. The covers 246 each have a pair of openings 247 (FIG. 13) defined within members 250 attached to the covers and usable for receiving the hinge pins 245. The two openings 247 of each cover have inlet ends 251 for the pins 245, said inlet ends being spaced apart at different distances than the distal ends of the respective hinge pins which they receive whereby the covers can be mounted on hinge pins without simultaneously inserting the hinge pins into both of the openings 247 for a given cover.

Each of the covers 246 has a generally rectangular configuration but is deformed with a criss-cross indentation 255 to provide strength. Secured to the lower surface 256 of each cover contiguous the periphery thereof is a flexible rubber-like seal 257 which engages the frame 200 of the respective filters when the cover is closed. The respective covers are locked down in air blocking position by means of latches 260 actuable by means of screw-driver receiving slots 261. Each of the latches 260 has a latch arm 262 which is rotatable beneath the forwardly projecting flange 216 to lock the cover in position. The air blocking element 222 is shown in detail in FIG. 12 and has a bracket 265 secured thereto for receiving one end of a tension spring 266, the other end of which is secured to an eyelet 267 fixed to the distal end of the forwardly facing window 270 of the trailer 269.

When the present device is mounted upon a trailer the window 270 is cranked outwardly by suitable crank means 271 and the frame 200 with its triangular attachments 202 is moved upwardly beneath the window 270 until inwardly curved portions 268 of the triangular members 202 engage the sides 268A of the window 270 and abut transversely extending flanges 270A similar to the flange shown at the distal end of the window 20 in FIG. 3. Also the upper ends 274 of members 202 are seated in recess 273 provided in the window frame 278 forming a part of the trailer 269. The frame 200 has a pair of slots 275 in its rearward portion 276 said slots receiving hooks 277 (FIG. 10) which projects in opposite directions and are swingably mounted upon the trailer 269 and particularly frame 278 thereof adjacent the lower edge of the aperture 280 for the window 270. The hooks 277 lock in place and support the frame 200 and the triangular members 202. The spring 266 holds the window 270 downwardly against the frame 200 and against the triangular members 202 and the elongated element 240. It also functions to cause the triangular members 202 to tightly engage and abut the trailer 269 at the recess 273 and the frame 200 to tightly engage and abut the trailer at the lower portion of the recess 273. A rubber-like sealing strip is secured to the frame 278 at the recess 273 and functions to prevent leakage of air, water, etc., between the frame 200 and the frame 278 and between the triangular members 202 and the frame 278.

It will be evident from the above description that in warm weather, such as during the summer, the covers 246 are removed and detached from the hinge pins. If limited ventilation is desired, members 290, the configuration of which is shown in FIGS. 7 and 8, are used. Thus members 290 can have their hook portions 291 seated on the distal ends of covers 246 and their ends 292 received in recesses 293 in frame 200, said recesses being defined in part by upstanding flange 294 of frame 200. The hook portions 291 are so configured as to have a spring bias therein when they grip the distal ends of the covers 246. That is, the hook portions must be spread to grip the covers.

From the above description, it will be evident that the present invention provides improved means for keeping dust and dirt out of the trailer. It will also be evident that the present invention provides means for preventing the breaking of forwardly facing windows of the trailer. One particularly desirable feature of the invention is the fact that it permits the maintaining of a constant flow of air into the trailer to cool the trailer and simultaneously functions to prevent dust from entering the openings 15 and 16 because of the pressure created within the trailer. Because of the fact that dust and dirt are kept out of the trailer and because it is kept cool by the entry of air, the trailer is always immediately available for occupancy, for example, at meal time. A further advantage that has been noted in the actual use of invention is the fact that a refrigerator in the trailer requires much less fuel because of the fact that the trailer is always cool.

While the invention has been illustrated and described in detail in the drawings and foregoing description, the same is to be considered as illustrative and not restrictive in character, it being understood that anly the preferred embodiment has been shown and described and that all changes and modifications that come within the spirit of the invention and the scope of the claims are also desired to be protected.

The invention claimed is:

1. A trailer ventilating arrangement comprising a trailer having windows and doors mounted within openings in the sides and rear of the trailer which openings permit passage of a certain amount of air even when the windows and doors are closed, said trailer having a forwardly facing aperture; a further transparent window having its upper edge swingably connected to said trailer at the upper edge of said aperture and extending downwardly and outwardly from said trailer; a rectangular frame mounted between said further transparent window and said trailer and engaging the lower edge of said aperture; and triangular members received between said further transparent window, said frame and said trailer and extending upwardly between said further window and trailer along the vertical sides of said aperture, hook means movably mounted on said trailer at the lower edge of said aperture, said hook means being formed to engage said frame for securing said frame to said trailer at the lower edge of said aperture, said hook means being movable to a position wherein said hooks disengage said frame and said frame is removable from said trailer, said frame having a vertical opening therethrough and having a pair of flanges projecting toward one another in said vertical opening, one of said flanges being secured to the forward portion of said frame and the other of said flanges being secured to the rearward portion of said frame; a pair of filters resting upon said flanges, said filters each having a pair of opposite sides; a further flange fixed to said frame above said flanges and projecting inwardly of said frame, said further flange acting as a retaining means preventing upward movement of one side of each of said filters; and means for removably retaining the other side of each of said filters and preventing upward movement thereof.

2. A trailer ventilating arrangement comprising a trailer having windows and doors mounted within openings in the trailer, said openings permitting passage of a certain amount of air even when the windows and doors are closed, said trailer having a forwardly facing window opening, a transparent window pivoted to said trailer at the upper edge of said window opening and swingable outwardly of the trailer, a sheet-like member mounted within said opening, said sheet-like member having a central rectangular aperture therein and a flange projecting inwardly of the window and spaced inwardly of the main body of said sheet so as to define a rectangular recess, a filter received within said recess abutting said flange, and means spacing said window away from said trailer.

3. A trailer ventilating arrangement comprising a trailer having windows and doors mounted within openings in the trailer, said openings permitting passage of a certain amount of air even when the windows and doors are closed, said trailer having a forwardly facing window opening, a transparent window pivoted to said trailer at the upper edge of said window opening and swingable outwardly of the trailer, a sheet-like member mounted within said opening, said sheet-like member having a central rectangular aperture therein and a flange projecting inwardly of the window and spaced inwardly of the main body of said sheet so as to define a rectangular recess, abutting said flange, rubber balls received between said sheet-like member and said window, and a tension spring connected between said window and said sheet-like member and urging said window against said rubber balls.

4. A trailer ventilating arrangement comprising a trailer having windows and doors mounted within openings in the trailer, said openings permitting passage of a certain amount of air even when the windows and doors are closed, said trailer having a forwardly facing window opening, a transparent window pivoted to said trailer at the upper edge of said window opening and swingable outwardly of the trailer, a sheet-like member mounted within said opening, said sheet-like member having a central rectangular aperture therein and a flange projecting inwardly of the window and spaced inwardly of the main body of said sheet so as to define a rectangular recess, said filter being received within said recess abutting said flange, rubber balls received between said sheet-like member and said window, a tension spring connected between said window and said sheet-like member and urging said window against said rubber balls, a further screen secured to and covering said window, and hooks connected to said further screen by tension springs and engaging the edges of said window, and rubber balls received between said further screen and said window.

5. A trailer ventilating arrangement comprising a trailer having windows and doors mounted within openings in the trailer, said openings permitting passage of a certain amount of air even when the windows and doors are closed, said trailer having a forwardly facing rectangular window opening with a horizontal upper edge, a transparent rectangular window pivoted to said trailer at the upper edge of said window opening and swingable outwardly of the trailer, a screen mounted within said window opening and positioned inwardly of the trailer relative to said window, a sheet-like member mounted within said opening, said sheet like-member having a central rectangular aperture therein and a flange projecting first inwardly of the trailer and then inwardly of said sheet so as to define a rectangular recess, said filter being received within said recess abutting said flange, said sheet-like member being provided with transparent windows located on opposite sides of and horizontally of said filter, rubber balls received between said sheet-like member and said window, a tension spring connected between said window and said sheet-like member and urging said window against said rubber balls, a further screen secured to and covering said window, and hooks connected to said further screen by tension springs and engaging the edges of said window, and rubber balls received between said further screen and said window.

6. A trailer ventilating arrangement comprising a trailer having windows and doors mounted within openings in the sides and rear of the trailer which openings permit passage of a certain amount of air even when the windows and doors are closed, said trailer having a forwardly facing aperture, a further transparent window having its upper edge swingably connected to said trailer at the upper edge of said aperture and extending downwardly and outwardly from said trailer, a rectangular frame, a pair of hooks swingably mounted on said trailer at the lower edge of said aperture, said frame having a pair of slots receiving said hooks for securing said frame to said trailer at the lower edge of said aperture, said hooks being swingable to a position wherein said hooks disengage said frame and said frame is removable from said trailer, a pair of triangular members each fixed to a respective end of said rectangular frame and extending upwardly between said further window and trailer along the vertical sides of said aperture, said frame having a vertical opening therethrough and having a pair of flanges projecting toward one another in said vertical opening intermediate of the vertical height of said frame, one of said flanges being secured to the forward portion of said frame and the other of said flanges being secured to the rearward portion of said frame, a pair of filters resting upon said flanges, a blocking element received between said filters and resting upon said flanges, a further flange fixed to said frame at the rearward portion thereof above said another flange and projecting toward the forward portion of said frame, said further flange acting as a retaining means preventing upward movement of said filters and blocking element, an elongated member of angle cross section, said elongated member having one leg inserted between said forward portion of said frame and said filters and blocking element, and a tension spring secured at one end to said blocking element adjacent said further flange and at the other end to said further window and holding said further window tightly against said triangular members.

7. A trailer ventilating arrangement comprising a trailer having windows and doors mounted within openings in the sides and rear of the trailer which openings permit passage of a certain amount of air even when the windows and doors are closed, said trailer having a forwardly facing aperture, a further transparent window having its upper edge swingably connected to said trailer at the upper edge of said aperture and extending downwardly and outwardly from said trailer, a rectangular frame, said frame being secured to said trailer at the lower edge of said aperture, a pair of triangular members each fixed to a respective end of said rectangular frame and extending upwardly between said further window and trailer along the vertical opening therethrough and having a pair of flanges projecting toward one another in said vertical opening intermediate of the vertical height of said frame, one of said flanges being secured to the forward portion of said frame and the other of said flanges being secured to the rearward portion of said frame, a pair of filters resting upon said flanges, a blocking element received between said filters and resting upon said flanges, a further flange fixed to said frame at the rearward portion thereof above said another flange and projecting toward the forward portion of said frame, said further flange acting as a retaining means preventing upward movement of said filters and blocking element, an elongated member of angle cross section, said elongated member having one leg inserted between said forward portion of said frame and said filters and blocking element, four hinge pins mounted on the other leg of said elongated member and extending horizontally and laterally of said trailer, a pair of covers for said filters, one of said covers being swingably mounted on one pair of said four hinge pins and the other of said covers being swingably mounted on the other pair of said four hinge pins, said covers each having a pair of openings for reception of said hinge pins, said hinge pin openings of each pair having inlet ends for said hinge pins which inlet ends are spaced apart a different distance than the distal ends of the hinge pins whereby said covers can be mounted on said hinge pins without simultaneous insertion thereof into both of a respective pair of hinge pin openings, a tension spring secured at one end to said blocking element adjacent said further flange and at the other end to said further window and holding said further window tightly against said triangular members, and means for locking said covers down tightly against said filters.

8. A trailer ventilating arrangement comprising a trailer having windows and doors mounted within openings in the sides and rear of the trailer which openings permit passage of a certain amount of air even when the windows and door are closed, said trailer having a forwardly facing aperture, a further transparent window having its upper edge swingably connected to said trailer at the upper edge of said aperture and extending downwardly and outwardly from said trailer, a rectangular frame, a pair of hooks swingably mounted on said trailer at the lower edge of said aperture, said frame having a pair of slots receiving said hooks for securing said frame to said trailer at the lower edge of said aperture, said hooks being swingable to a position wherein said hooks disengage said frame and said frame is removable from said trailer, a pair of triangular members each fixed to a respective end of said rectangular frame and extending upwardly between said further window and trailer along the vertical sides of said aperture, said frame having a vertical opening therethrough and having a pair of flanges projecting toward one another in said vertical opening intermediate of the vertical height of said frame, one of said flanges being secured to the forward portion of said frame and the other of said flanges being secured to the rearward portion of said frame, a pair of filters resting upon said flanges, a blocking element received between said filters and resting upon said flanges, a further flange fixed to said frame at the rearward portion thereof above said another flange and projecting toward the forward portion of said frame, said further flange acting as a retaining means preventing upward movement of said filters and blocking element, an elongated member of angle cross section, said elongated member having one leg inserted between said forward portion of said frame and said filters and blocking element, four hinge pins mounted on the other leg of said elongated member and extending horizontally and laterally of said trailer, a pair of covers for said filters, one of said covers being swingably mounted on one pair of said four hinge pins and the other of said covers being swingably mounted on the other pair of said four hinge pins, said covers each having a pair of openings for reception of said hinge pins, said hinge pin openings of each pair having inlet ends for said hinge pins which inlet ends are spaced apart a different distance than the distal ends of the hinge pins whereby said covers can be mounted on said hinge pins without simultaneous insertion thereof into both of a respective pair of hinge pin openings, a tension spring secured at one end to said blocking element adjacent said further flange and at the other end to said further window and holding said further window tightly against said triangular members, and means for locking said covers down tightly against said filters.

9. A trailer ventilating arrangement comprising a trailer having windows and doors mounted within openings in the sides and rear of the trailer which openings permit passage of a certain amount of air even when the windows and doors are closed, said trailer having a forwardly facing aperture, a further transparent window having its upper edge swingably connected to said trailer at the upper edge of said aperture and extending downwardly and outwardly from said trailer, a rectangular frame, a pair of hooks swingably mounted on said trailer at the lower edge of said aperture, said frame having a pair of slots receiving said hooks for securing said frame to said trailer at the lower edge of said aperture, said hooks being swingable to a position wherein said hooks disengage said frame and said frame is removable from said trailer, a pair of triangular members each fixed to a respective end of said rectangular frame and extending upwardly between said further window and trailer along the vertical sides of said aperture, said frame having a vertical opening therethrough and having a pair of flanges projecting toward one another in said vertical opening intermediate of the vertical height of said frame, one of said flanges being secured to the forward portion of said frame and the other of said flanges being secured to the rearward portion of said frame, a pair of filters resting upon said flanges, a blocking element received between said filters and resting upon said flanges, a further flange fixed to said frame at the rearward portion thereof above said another flange and projecting toward the forward portion of said frame, said further flange acting as a retaining means preventing upward movement of said filters and blocking element, an elongated member of angle cross section, said elongated member having one leg inserted between said forward portion of said frame and said filters and blocking element, four hinge pins mounted on the other leg of said elongated member and extending horizontally and laterally of said trailer, a pair of covers for said filters, one of said covers being swingably mounted on one pair of said four hinge pins and the other of said covers being swingably mounted on the other pair of said four hinge pins, said covers each having a pair of openings for reception of said hinge pins, said hinge pin openings of each pair having inlet ends for said hinge pins which inlet ends are spaced apart a different distance than the distal ends of the hinge pins whereby said covers can be mounted on said hinge pins without simultaneous insertion thereof into both of a respective pair of hinge pin openings, a tension spring secured at one end to said blocking element adjacent said further flange and at the other end to said further window and holding said further window tightly against said triangular members, means for locking said covers down tightly against said filters and means for supporting said covers in a raised position including at one end thereof a hook portion having spring biased jaws adapted to engage the respective cover and having another end adapted to engage said frame.

10. A trailer ventilating arrangement comprising a trailer having windows and doors mounted within openings in the sides and rear of the trailer which openings permit passage of a certain amount of air even when the windows and doors are closed, said trailer having a forwardly facing aperture, said trailer having at said aperture a recess one wall of which faces forwardly and one wall of which faces inwardly, a further transparent window having its upper edge swingably connected to said trailer at the upper edge of said aperture and extending downwardly and outwardly from said trailer, said further window having a recess one wall of which faces outwardly and one wall of which faces rearwardly, a rectangular frame, a pair of hooks swingably mounted on said trailer at the lower edge of said aperture, said frame having a pair of slots receiving said hooks for securing said frame to said trailer at the lower edge of said aperture in the recess thereof, said hooks being swingable to a position wherein said hooks disengage said frame and said frame is removable from said trailer, a pair of triangular members each fixed to a respective end of said rectangular frame and extending upwardly between said further window and trailer along the vertical sides of said aperture in said recess thereof, said frame having a vertical opening therethrough and having a pair of flanges projecting toward one another in said vertical opening intermediate of the vertical height of said frame, one of said flanges being secured to the forward portion of said frame and the other of said flanges being secured to the rearward portion of said frame, a pair of filters resting upon said flanges, a blocking element received between said filters and resting upon said flanges, a further flange fixed to said frame at the rearward portion thereof above said another flange and projecting toward the forward portion of said frame, said further flange acting as a retaining means preventing upward movement of said filters and blocking element, an elongated member of angle cross section, said elongated member having one leg inserted between said forward portion of said frame and said filters and blocking element, four hinge pins and the other of said covers being swingably mounted on the other pair of said four hinge pins, said covers each having a pair of openings for reception of said hinge pins, said hinge pin openings of each pair having inlet ends for said hinge pins which inlet ends are spaced apart a different distance than the distal ends of the hinge pins whereby said covers can be mounted on said hinge pins without simultaneous insertion thereof into both of a respective pair of hinge pin openings, a tension spring secured at one end to said blocking element adjacent said further flange and at the other end to said further window and holding said further window tightly against said triangular members, said triangular members being seated in the recess of said further window, and means for locking said covers down tightly against said filters.

References Cited by the Examiner

UNITED STATES PATENTS

| | | | |
|---|---|---|---|
| 2,124,696 | 7/1938 | Hall | 98—2.2 |
| 2,247,947 | 7/1941 | Henderson | 98—88 |
| 2,291,383 | 7/1942 | Espenschied. | |
| 2,931,578 | 4/1960 | Thompson | 98—88 X |

MEYER PERLIN, *Primary Examiner.*